(12) United States Patent
Baek

(10) Patent No.: US 7,936,431 B2
(45) Date of Patent: May 3, 2011

(54) LIQUID CRYSTAL DISPLAY HAVING SUBPIXELS PER COLOR PIXEL

(75) Inventor: Seung-Soo Baek, Seoul (KR)

(73) Assignee: Samsung Electronics Co., Ltd., Suwon-Si (KR)

(*) Notice: Subject to any disclaimer, the term of this patent is extended or adjusted under 35 U.S.C. 154(b) by 682 days.

(21) Appl. No.: 11/959,576

(22) Filed: Dec. 19, 2007

(65) Prior Publication Data
US 2008/0094560 A1    Apr. 24, 2008

Related U.S. Application Data

(63) Continuation of application No. 11/232,173, filed on Sep. 21, 2005, now Pat. No. 7,324,170.

(30) Foreign Application Priority Data

Sep. 24, 2004 (KR) .................. 10-2004-0077499

(51) Int. Cl.
*G02F 1/1343* (2006.01)
(52) U.S. Cl. ...................................... 349/144
(58) Field of Classification Search ............ 349/39, 349/43, 144, 147
See application file for complete search history.

(56) References Cited

U.S. PATENT DOCUMENTS 7,554,617 B2 * 6/2009 Jung et al. ................. 349/38
2002/0047822 A1 4/2002 Senda et al.

FOREIGN PATENT DOCUMENTS

| CN | 2483741 | 3/2002 |
|---|---|---|
| CN | 1410814 | 4/2003 |
| JP | 07-028065 | 1/1995 |
| JP | 09-269509 | 10/1997 |
| KR | 1020020066977 | 8/2002 |
| KR | 1020040001687 | 1/2004 |

* cited by examiner

Primary Examiner — James A Dudek
(74) Attorney, Agent, or Firm — F. Chau & Associates, LLC (57) ABSTRACT

A liquid crystal display includes: a first substrate; a gate line disposed on the first substrate; a data line intersecting the gate line; a thin film transistor connected to the gate line and the data line; a coupling electrode connected to the thin film transistor; a first sub-pixel electrode connected to the thin film transistor; a second sub-pixel electrode capacitively coupled to the coupling electrode; a second substrate facing the first substrate; a common electrode disposed on the second substrate; and a polarizer disposed on the first substrate or the second substrate and having a polarization axis. The coupling electrode is elongated substantially parallel to the polarization axis and has a first edge substantially parallel to or substantially perpendicular to the polarization axis.

16 Claims, 8 Drawing Sheets

LIQUID CRYSTAL DISPLAY HAVING SUBPIXELS PER COLOR PIXEL

CROSS-REFERENCE TO RELATED APPLICATIONS

This application is a continuation of U.S. patent application Ser. No. 11/232,173, filed Sep. 21, 2005, now U.S. Pat. No. 7,324,170, which claims priority to Korean Patent Application No. 2004-0077499, filed Sep. 24, 2004, the contents of which are herein incorporated by reference in their entireties.

BACKGROUND OF THE INVENTION

1. Field of the Invention

The invention relates to a liquid crystal display, and more particularly, to a liquid crystal display having two subpixels with two different tilt directions of the LC molecules and two different luminances per color pixel.

2. Description of the Related Art

A liquid crystal display (LCD) is one of the most widely used flat panel displays. An LCD includes two panels (e.g., two substrates, having field-generating electrodes such as pixel electrodes and a common electrode) having polarizing filters and a liquid crystal (LC) layer interposed therebetween. The LCD displays images by applying voltages to the field-generating electrodes to generate an electric field across the LC layer, which determines orientations of LC molecules in the LC layer to adjust the polarization of incident light. The liquid crystal twists the polarization of light entering one filter to allow it to pass through the other filter.

The LCD further includes a plurality of thin film transistors (TFTs) connected to the pixel electrodes, and a plurality of signal lines connected to the TFTs and transmitting signals to the TFTs.

Among the various types of LCD displays, there is a vertical alignment (VA) mode LCD, which aligns LC molecules such that the long axes of the LC molecules are perpendicular to the panels in absence of electric field, is preferred because of its high contrast ratio and wide reference viewing angle.

The wide viewing angle of the VA mode LCD can be realized by providing cutouts in the field-generating electrodes and protrusions on the field-generating electrodes. Since the cutouts and the protrusions can determine the tilt directions of the LC molecules, the tilt directions of LC molecules can be distributed into several directions by designing the cutouts and the protrusions such that the reference viewing angle is widened.

However, the VA mode LCD has poor lateral visibility as compared with frontal visibility. For example, a lateral gamma curve is different from a frontal gamma curve.

In addition, the arrangement of LC molecules may be distorted due to the height difference caused by the signal lines, causing light leakage, thereby decreasing the contrast ratio.

SUMMARY OF THE INVENTION

A liquid crystal display according to an embodiment of the invention includes: a first substrate; a gate line disposed on the first substrate; a data line intersecting the gate line; a thin film transistor connected to the gate line and the data line; a coupling electrode (of a coupling capacitor) connected to the thin film transistor; a first sub-pixel electrode connected to the thin film transistor; a second sub-pixel electrode capacitively coupled to the coupling electrode; a second substrate facing the first substrate; a common electrode disposed on the second substrate; and a polarizer disposed on the first substrate or the second substrate and having a polarization axis, wherein the coupling electrode (of a coupling capacitor) is elongated substantially parallel to the polarization axis and has a first edge substantially parallel to or substantially perpendicular to the polarization axis.

The degree of the tilt ("tilt angle") of the LC molecules determines the change of the polarization of light incident on the LC layer and the change of the light polarization causes a change of the light transmittance through the polarizers. In this way, the LCD displays images. The tilt angle of the LC molecules depends on the strength of the electric field (e.g., perpendicular to the surfaces of the panels generated in the LC layer). Since the voltage of the first subpixel LC capacitor and the voltage of the second subpixel LC capacitor are different from each other, the tilt direction of the LC molecules in the first subpixel is different from the tilt direction of the LC molecules in the second subpixel and thus the luminances of the two subpixels are different. The average luminance of the two subpixels is a target luminance, and the LC capacitor voltages of the first and the second subpixels can be adjusted so that an image viewed from a lateral side is the most similar to an image viewed from the front, thereby improving the lateral visibility.

The ratio of the first and second subpixel LC capacitor voltages can be adjusted by varying the capacitance of the coupling capacitor, and the coupling capacitance can be varied by changing the overlapping area of the coupling electrode and/or by changing the distance between the coupling electrode and the second sub-pixel electrode.

The thin film transistor may include a first electrode connected to the gate line, a second electrode connected to the data line, and a third electrode connected to the first sub-pixel electrode and to the coupling electrode.

The third electrode may have an edge substantially parallel to or substantially perpendicular to the polarization axis of the polarizer.

The liquid crystal display may further include an interconnection connecting the third electrode and the coupling electrode.

The interconnection may include an edge or portion extending substantially parallel to or substantially perpendicular to the polarization axis of the polarizer. Alternatively, the interconnection may include an edge or portion extending obliquely (not parallel to nor substantially perpendicular) relative to the polarization axis of the polarizer.

The liquid crystal display may further include a storage electrode overlapping at least one of the first and the second pixel electrodes. The storage electrode may have an edge substantially parallel to or substantially perpendicular to the polarization axis of the polarizer.

The coupling electrode may have a second edge oblique to the polarization axis of the polarizer and the storage electrode may have an edge disposed near the second edge of the coupling electrode.

The liquid crystal display may further include a partitioning member (e.g., cutout) partitioning at least one of the first and the second sub-pixel electrodes into a plurality of sub-areas.

The partitioning member (e.g., cutout) may have mirror symmetry with respect to a line (e.g., a transverse central line).

The partitioning member (e.g., cutout) may extend in a direction making an angle of about 45 degrees.

The partitioning member may include a cutout provided at the first sub-pixel electrode, the second subpixel electrode, or the common electrode.

The liquid crystal display may further include a storage electrode overlapping the partitioning member.

BRIEF DESCRIPTION OF THE DRAWINGS

The above and other features of the invention will become more apparent to persons skilled in the art by describing embodiments thereof in detail with reference to the accompanying drawings. The invention may, however, be embodied in many different forms and should not be construed as limited to the embodiments set forth herein.

In the drawings, the thickness of layers, films and regions are exaggerated for clarity. Like numerals refer to like elements throughout. It will be understood that when an element such as a layer, film, region or substrate is referred to as being "on" or "upon" another element, it can be directly on the other element or intervening elements may also be present. In contrast, when an element is referred to as being "directly on" another element, there are no intervening elements present.

In the figures.

DETAILED DESCRIPTION OF EMBODIMENTS

FIGS. 1-5 depict an LCD according to an embodiment of the invention.

Figure 1:
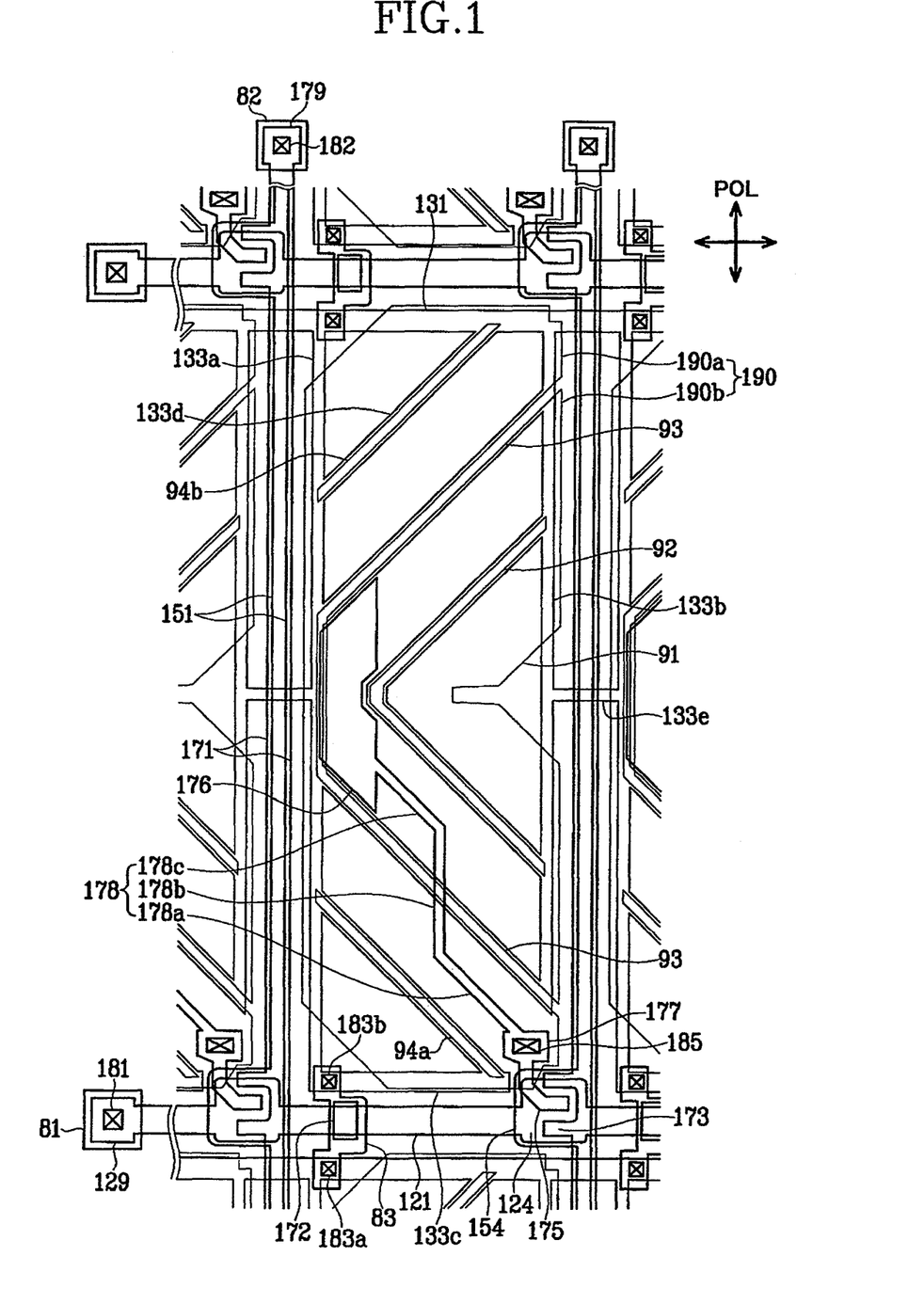
FIG. 1 is a layout view of a TFT array panel 100 of an LCD according to an embodiment of the invention.
Figure 2:
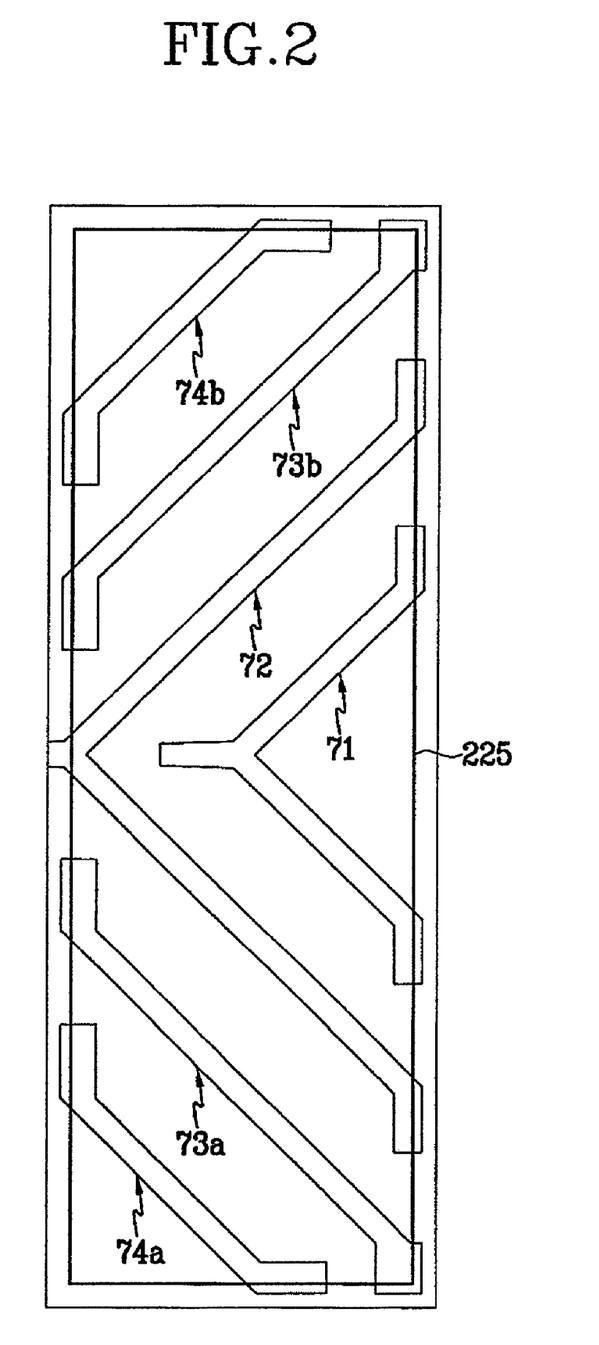
FIG. 2 is a layout view of a common electrode panel 200 of an LCD according to an embodiment of the invention.
Figure 3:
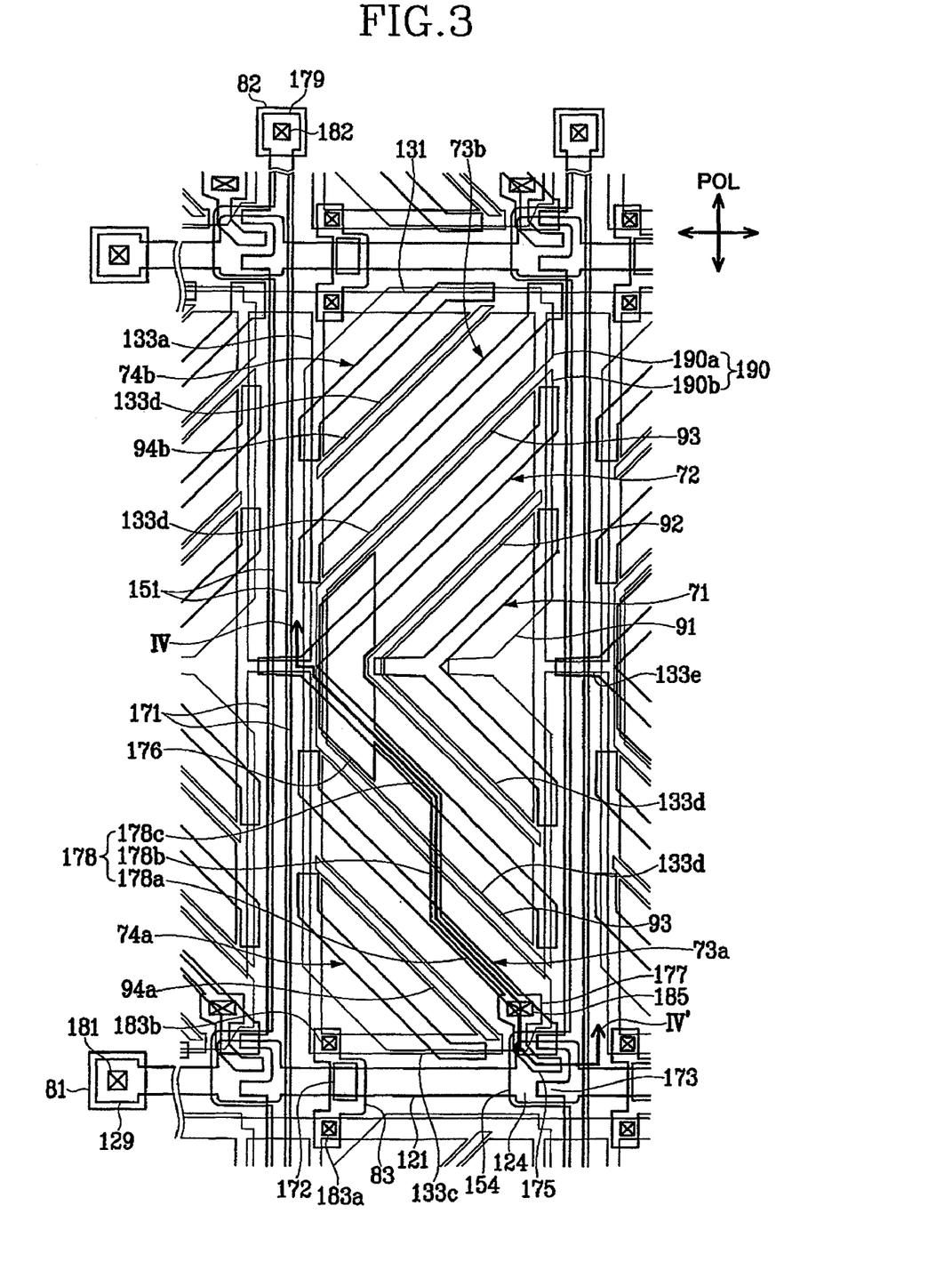
FIG. 3 is a layout view of an LCD including the TFT array panel 100 shown in FIG. 1 and the common electrode panel 200 shown in FIG. 2.
Figure 4:
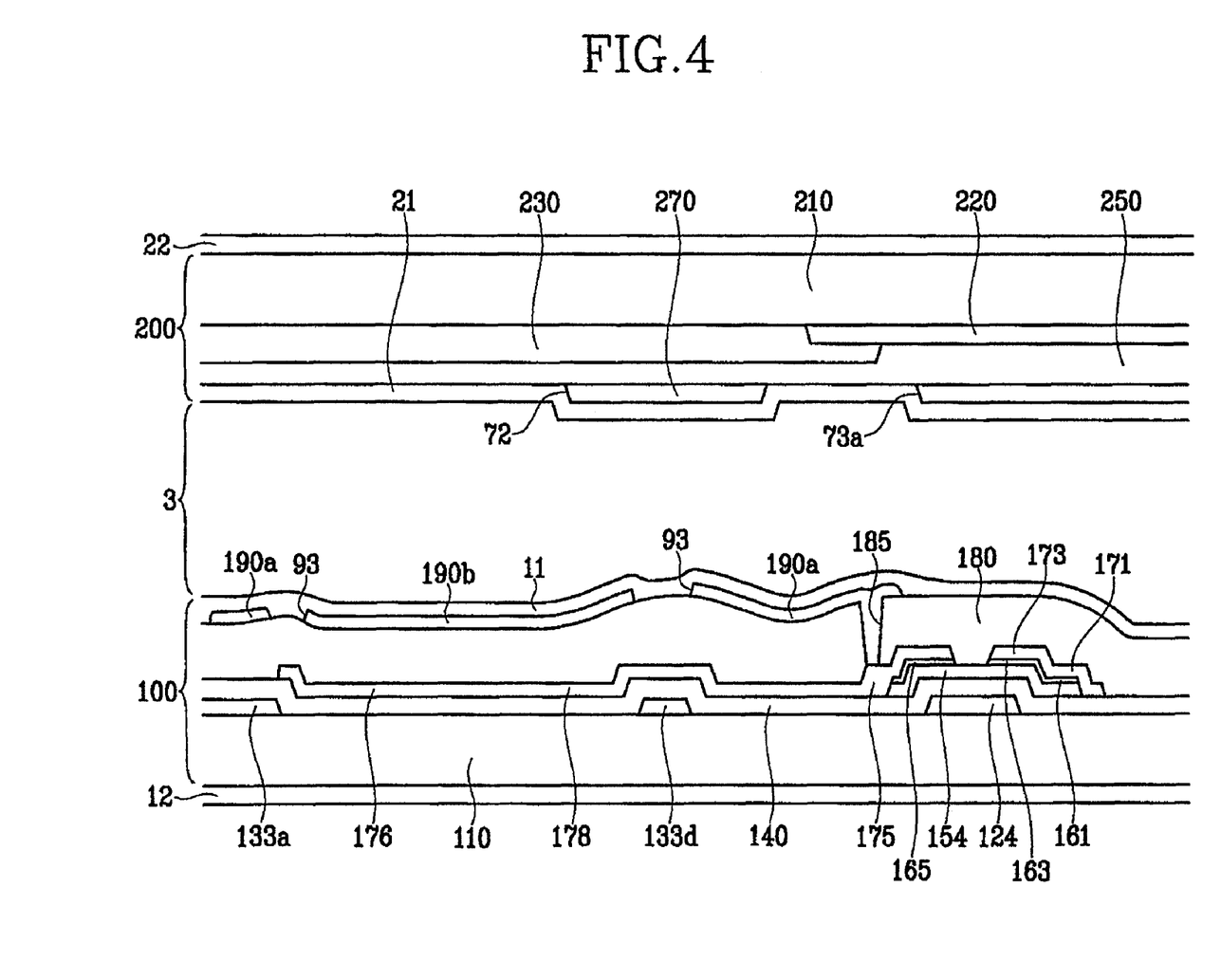
FIG. 4 is a sectional view of the LCD shown in FIG. 3 taken along section line IV-IV'.
Figure 5:
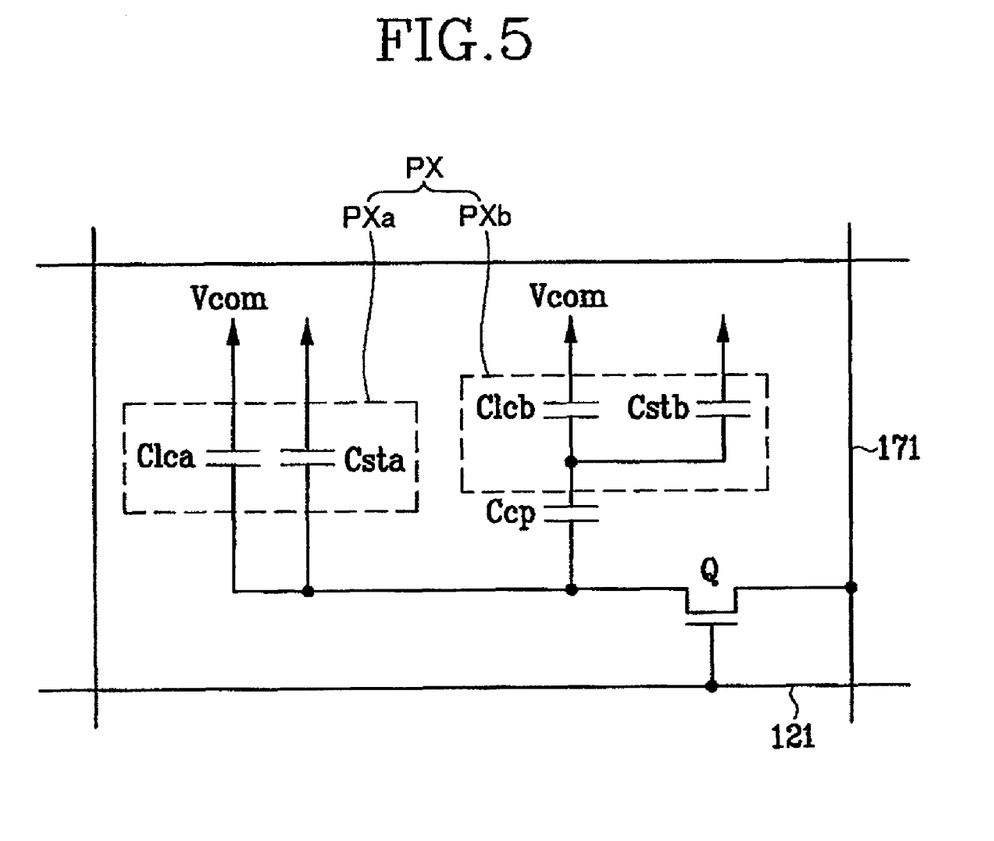
FIG. 5 is an equivalent circuit diagram of the LCD shown in FIGS. 1-4.

FIG. 1 is a layout view of a TFT array panel of an LCD according to an embodiment of the invention, FIG. 2 is a layout view of a common electrode panel of an LCD according to an embodiment of the invention, FIG. 3 is a layout view of an LCD including the TFT array panel shown in FIG. 1 and the common electrode panel shown in FIG. 2, FIG. 4 is a sectional view of the LCD shown in FIG. 3 taken along section line IV-IV', and FIG. 5 is an equivalent circuit diagram of the LCD shown in FIGS. 1-4.

Referring to FIGS. 1-4, an LCD according to an embodiment of the invention includes a TFT array panel (substrate) 100, a common electrode panel (substrate) 200, and a LC layer 3 interposed between the panels 100 and 200.

The TFT array panel (substrate) 100 will be described in detail with reference FIGS. 1, 3 and 4.

A plurality of gate conductors including a plurality of gate lines 121 (FIGS. 1 & 3) and a plurality of storage electrode lines 131 (FIGS. 1 & 3) are formed on an insulating substrate 110 (FIG. 4) such as transparent glass or plastic.

The gate lines 121 (FIGS. 1 & 3) transmit gate signals and extend substantially in a transverse direction. Each gate line 121 (FIGS. 1 & 3) includes a plurality of gate electrodes 124 (FIGS. 1, 3 & 4) projecting upward and downward and an end portion 129 (FIGS. 1 & 3) having a large area for contact with another layer or a (gate) driving circuit. A gate driving circuit (not shown) for generating the gate signals may be mounted on a flexible printed circuit (FPC) film (not shown), which may be attached to the substrate 110, directly mounted on the substrate 110, or integrated onto the substrate 110. The gate lines 121 may extend to be connected to a (gate) driving circuit that may be integrated on the substrate 110.

The storage electrode lines 131 (FIGS. 1 & 3) are supplied with a predetermined voltage and each of the storage electrode lines 131 includes a stem extending substantially parallel to the gate lines 121 (FIGS. 1 & 3), a plurality of sets of first, second, third, and fourth storage electrodes 133a, 133b, 133c and 133d branched from the stem, and a plurality of storage connections 133e (FIGS. 1, 3 & 4). Each of the storage electrode lines 131 is disposed between two adjacent gate lines 121 and the stem of a storage electrode line 131 is closer to one of (e.g., the upper one of) the two adjacent gate lines 121.

The first and the second storage electrodes 133a and 133b extend from the stem in a longitudinal direction and are parallel to each other. The third storage electrode 133c extends in the transverse direction toward a gate electrode 124 from an end portion of the first storage electrode 133a. Most of the fourth storage electrodes 133d obliquely extend from the first storage electrode 133a to the stem of the storage electrode line 131, from the second storage electrode 133b, or from the third storage electrode 133c. However, one of the fourth storage electrodes 133d obliquely extends from the second storage electrode 133b, changes direction, and obliquely returns to the second storage electrode 133b. Each of the storage connections 133e is connected between adjacent sets of storage electrodes 133a-133d. However, the storage electrode lines 131 and the storage electrodes may have various other shapes and arrangements.

The gate conductors 121 and 131 are preferably made of Al containing metal such as Al and Al alloy, an Ag containing metal such as Ag and Ag alloy, a Cu containing metal such as Cu and Cu alloy, a Mo containing metal such as Mo and Mo alloy, Cr, Ta, or Ti. However, they may have a multi-layered structure including two conductive films (not shown) having different physical characteristics. One of the two films is preferably made of low resistivity metal including an Al containing metal, an Ag containing metal, and a Cu containing metal, for reducing signal delay or voltage drop. The other film is preferably made of material such as a Mo containing metal, a Cr, Ta, or Ti, which has good physical, chemical, and electrical contact characteristics with other materials such as indium tin oxide (ITO) or indium zinc oxide (IZO). Examples of the combination of the two films are a lower Cr film and an upper Al (alloy) film; and a lower Al (alloy) film and an upper Mo (alloy) film. However, the gate conductors 121 and 131 may be made of various other metals or conductors.

As shown in FIG. 4, the lateral sides (edges) of the gate conductors 121 and 131 are inclined relative to a surface of the substrate 110, and the inclination angle thereof ranges about 30-80 degrees.

A gate insulating layer 140 (FIG. 4) preferably made of silicon nitride (SiNx) or silicon oxide (SiOx) is formed on the gate conductors 121 and 131.

A plurality of semiconductor stripes 151 (FIGS. 1 & 3) (preferably made of hydrogenated amorphous silicon (abbreviated to "a-Si") or polysilicon are formed on the gate insulating layer 140. Each semiconductor stripe 151 extends substantially in the longitudinal direction and has a plurality of projections 154 (FIGS. 1, 3 & 4) branched out toward (e.g., over) the gate electrodes 124.

A plurality of ohmic contact (stripes and islands) 161 (163) and 165 (FIG. 4) are formed on the semiconductor stripes 151

(154) (FIG. 4). The ohmic contacts 161 and 165 are preferably made of n+hydrogenated a-Si heavily doped with an n-type impurity such as phosphorous, or they may be made of silicide. Each ohmic contact stripe 161 has a plurality of projections 163, and the projections 163 and the ohmic contact islands 165 are located in pairs on the projections 154 of the semiconductor stripes 151 (see FIG. 4).

The lateral sides of the semiconductor islands stripes 151 and the ohmic contacts 161 (163) and 165 are inclined relative to the surface of the substrate 110, and the inclination angles thereof are preferably in a range of about 30-80 degrees.

A plurality of data conductors including a plurality of data lines 171, a plurality of drain electrodes 175, and a plurality of isolated metal interconnects 172 are formed on the ohmic contacts 163 and 165 (FIG. 4) and the gate insulating layer 140.

The data lines 171 transmit data signals and extend substantially in the longitudinal direction to intersect the gate lines 121, the stems of the storage electrode lines 131 and the storage connections 133e. Each data line 171 includes a plurality of source electrodes 173 projecting toward the gate electrodes 124 and curved like the alpha character "C", and an end portion 179 having a large area for contact with another layer or an (external, data) driving circuit. A data driving circuit (not shown) for generating the data signals may be mounted on a FPC film (not shown), which may be attached to the substrate 110, directly mounted on the substrate 110, or integrated onto the substrate 110. The data lines 171 may extend to be connected to a data driving circuit that may be integrated on the substrate 110.

Each of the drain electrodes 175 is electrically separated from the data lines 171 and includes a narrow portion and a first expansion 177 connected to the narrow portion. An end of the narrow portion of the drain electrode 175 is disposed opposite the source electrode 173 and is partly surrounded by (the "C" of) the source electrode 173, over the gate electrode 124.

Each drain electrode 175 further includes a second expansion 176 and an interconnection 178 (178a, 178b, 178c). The second expansion 176 is referred to as a coupling electrode (of a "coupling capacitor" Ccp) and is approximately a trapezoid having its parallel (left and right) edges parallel to the data lines 171, and a pair of oblique edges disposed near the fourth storage electrodes 133d. Herein, "Oblique" means tilted at an angle; neither vertical (longitudinal) nor horizontal (transverse). The interconnection 178 (178a, 178b, 178c) (FIGS. 1, 3 & 4) connects the first expansion 177 and the second expansion 176 and includes a longitudinal portion (178b) and a pair of oblique portions (178a & 178c).

The metal interconnects 172 are disposed on the gate electrodes 121 near the storage electrode lines 131 near the first storage electrodes 133a. A gate electrode 124, a source electrode 173, and a drain electrode 175 along with a projection 154 of a semiconductor stripe 151 form a thin-film transistor (TFT) having a channel formed in the semiconductor (projection 154) disposed between the source electrode 173 and the drain electrode 175.

The data conductors 171, 172 and 175 are preferably made of refractory metal such as Cr, Mo, Ta, Ti, or alloys thereof. However, they may have a multilayered structure including a refractory metal film (not shown) and a low resistivity film (not shown). Good examples of the multi-layered structure are a double-layered structure including a lower Cr/Mo (alloy) film and an upper Al (alloy) film and a triple-layered structure of a lower Mo (alloy) film, an intermediate Al (alloy) film, and an upper Mo (alloy) film. However, the data conductors 171, 172 and 175 may be made of various other metals or conductors.

The data conductors 171, 172 and 175 have inclined edge profiles, and the inclination angles thereof range about 30-80 degrees. (The lateral sides of the data conductors 171, 172 and 175 are inclined relative to a surface of the substrate 110, and the inclination angle thereof ranges about 30-80 degrees.)

The ohmic contacts 161 (163) and 165 are interposed only between the underlying semiconductor stripes 151 (154) and the overlying data conductors 171 (173) and 175 thereon and reduce the contact resistance therebetween. The semiconductor stripes 151 include some exposed portions, which are not covered with the data conductors 171 and 175, such as transistor channel portions located between the source electrodes 173 and the drain electrodes 175.

A passivation layer 180 is formed on the data conductors 171, 172 and 175, and the exposed portions of the semiconductor stripes 151 (154). The passivation layer 180 is preferably made of inorganic or organic insulator and it may have a flat surface. Examples of the inorganic insulator include silicon nitride and silicon oxide. The organic insulator may have photosensitivity and it preferably has dielectric constant less than about 4.0. The passivation layer 180 may include a lower film of inorganic insulator and an upper film of organic insulator such that it takes the excellent insulating characteristics of the organic insulator while preventing the exposed portions of the semiconductor stripes 151 (154) from being damaged by the organic insulator.

The passivation layer 180 has a plurality of contact holes 182 and 185 exposing the end portions 179 of the data lines 171 and the first expansions 177 of the drain electrodes 175, respectively. The passivation layer 180 and the gate insulating layer 140 have a plurality of contact holes 181 exposing the end portions 129 of the gate lines 121, a plurality of contact holes 183a exposing portions of the storage electrode lines 131 near the connection with the first storage electrodes 133a, and a plurality of contact holes 183b exposing the third storage electrodes 133c near the connection with the first storage electrodes 133a.

A plurality of pixel electrodes 190, a plurality of overpasses 83, and a plurality of contact assistants 81 and 82 are formed on the passivation layer 180. They are preferably made of transparent conductor such as ITO or IZO or reflective conductor such as Ag, Al, Cr, or alloys thereof.

Each pixel electrode 190 (190a & 190b) is approximately a rectangle having chamfered left corners and the chamfered edges of the pixel electrode 190 make an angle of about 45 degrees with the gate lines 121.

Each of the pixel electrodes 190 has a gap 93 that divides the pixel electrode 190 into an outer sub-pixel electrode 190a and an inner sub-pixel electrode 190b.

The gap 93 includes lower and upper oblique portions and a longitudinal portion connecting them. The lower and the upper portions of the gap 93 extend from a left edge to a right edge of the pixel electrode 190 making an (oblique) angle of about 45 degrees to the longitudinal gate lines 121. The longitudinal portion of the gap 93 connects left ends of the lower and the upper (oblique) portions and overlaps a first storage electrode 133a. The longitudinal portion of the gap 93 is shorter than each of the lower and the upper (oblique) portions. Accordingly, the inner sub-pixel electrode 190b is an isosceles trapezoid and the outer subpixel electrode 190a includes a pair of right-angled trapezoids. A longitudinal connection connects the pair of right-angled trapezoids.

As shown in FIGS. 1, 3 & 4, the outer subpixel electrode 190a is connected to the first expansion 177 of the drain electrode 175 through a contact hole 185.

The inner sub-pixel electrode 190b overlaps a coupling electrode 176 (of a "coupling capacitor") and an interconnection 178. The inner sub-pixel electrode 190b and the coupling electrode 176 along with the interconnection 178 (separated by the dielectric passivation layer 180) form a "coupling capacitor."

The inner sub-pixel electrode 190b has central cutouts 91 and 92; a lower half of the outer sub-pixel electrode 190a has a lower cutout 94a; and an upper half of the outer sub-pixel electrode 190a has an upper cutout 94b. The cutouts 91, 92, 94a and 94b partition the sub-pixel electrodes 190b and 190a into a plurality of partitions. The pixel electrode 190 having the cutouts 91, 92, 94a and 94b and the gap 93 substantially has mirror symmetry with respect to an imaginary transverse line bisecting the pixel electrode 190. Individual portions of the gap 93 will be also referred to as cutouts hereinafter.

Each of the lower and the upper cutouts 94a and 94b extends obliquely approximately from a lower edge or an upper edge of the pixel electrode 190 approximately to a left edge of the pixel electrode 190. The (oblique) lower and the upper cutouts 94a and 94b are disposed at angles of about 45 degrees relative to the gate lines 121, and they extend substantially perpendicular to each other.

The center cutout 91 extends along the imaginary transverse line and has an inlet from the right edge of the pixel electrode 191, which has a pair of inclined edges substantially parallel to the lower cutout 94a and the upper cutout 94b, respectively.

The center cutout 92 includes a pair of oblique portions connected to each other and extend from the connection therebetween toward the right edge of the pixel electrode 190 in parallel to the lower and the upper cutouts 94a and 94b, respectively.

The number of the cutouts or the number of the partitions may be varied depending on the design factors such as the size of the pixel electrode 190, the ratio of the transverse edges and the longitudinal edges of the pixel electrode 190, the type and characteristics of the liquid crystal layer 3, and so on.

In the meantime, the coupling electrode 176 is disposed between the cutouts 92 and 93, and the oblique edges of the coupling electrode 176 are disposed near the lower and the upper portions of the gap (cutout) 93. The fourth storage electrodes 133d overlap the cutouts 91, 92, 93, 94a, and 94b.

The overpasses 83 crosses over the gate lines 121 and are connected to the exposed portions of the stems of the storage electrode lines 131 and the exposed portions of the third storage electrodes 133c through the contact holes 183a and 183b, respectively, which are disposed on opposite sides of the gate lines 121. The storage electrode lines 131 including the storage electrodes 133a-133d along with the overpasses 83 can be used for repairing defects in the gate lines 121, the data lines 171, or the TFTs.

The contact assistants 81 and 82 are connected to the end portions 129 of the gate lines 121 and the end portions 179 of the data lines 171 through the contact holes 181 and 182, respectively. The contact assistants 81 and 82 protect the end portions 129 and 179 and enhance the adhesion between the end portions 129 and 179 and external devices.

The description of the common electrode panel 200 follows with reference to FIGS. 2-4.

A light blocking member 220 (FIG. 4) referred to as a black matrix for preventing light leakage is formed on an insulating substrate 210 such as transparent glass or plastic. The light blocking member 220 (FIG. 4) has a plurality of (rectangular) openings 225 (FIG. 2) that face (above) the (rectangular) pixel electrodes 191 and it may have substantially the same planar shape (e.g., a rectangle) as the pixel electrodes 191. Otherwise, the light blocking member 220 may include a plurality of rectilinear portions facing the data lines 171 on the TFT array panel 100 and a plurality of widened portions facing the TFTs on the TFT array panel 100.

A plurality of color filters 230 (FIG. 4) are also formed on the substrate 210 and they are disposed substantially in the openings 225 (FIG. 2) in areas enclosed by the light blocking member 220 (FIG. 4). The color filters 230 may extend substantially in the longitudinal direction along the pixel electrodes 190. The color filters 230 may represent one of the primary colors such as red, green and blue colors.

An overcoat 250 is formed on the color filters 230 and the light blocking member 220. The overcoat 250 is preferably made of (organic) insulator and it prevents the color filters 230 from being exposed and provides a flat surface.

A common electrode 270 is formed on the overcoat 250. The common electrode 270 is preferably made of transparent conductive material such as ITO and IZO and (as shown in FIG. 2 especially) has a plurality of sets of cutouts 71, 72, 73a, 73b, 74a and 74b.

A set of cutouts 71-74b (71, 72, 73a, 73b, 74a and 74b) of common electrode 270 face a pixel electrode 190 and include center cutouts 71 and 72, lower cutouts 73a and 74a, and upper cutouts 73b and 74b. Each of the cutouts 71-74b of common electrode 270 is disposed between adjacent cutouts 91, 92, 93, 94a, and 94b of the pixel electrode 190 or between a cutout 94a or 94b and a chamfered edge of the pixel electrode 190. Each of the cutouts 71-74b of common electrode 270 has at least an oblique portion extending parallel to the lower cutout 94a or the upper cutout 94b of the pixel electrode 190. The cutouts 71-74b of common electrode 270 have substantially a mirror symmetry with respect to the above-described imaginary transverse line bisecting the pixel electrode 190.

Each of the lower and the upper cutouts 73a-74b of common electrode 270 includes an oblique portion and a pairing of transverse and longitudinal portions or a pairing of a longitudinal portion and an expansion. The oblique portion extends approximately from a lower edge, an upper edge, or a right corner of the pixel electrode 190 approximately to a left edge of the pixel electrode 190. The transverse and longitudinal portions extend from respective ends of the oblique portion along edges of the (rectangular) pixel electrode 190, overlapping the edges of the pixel electrode 190, and making obtuse angles with the oblique portion. The expansion among each of the lower and the upper cutouts 73a-74b of common electrode 270 is disposed near a (right)_corners of the pixel electrode 190 (See FIG. 2).

Each of the center cutouts 71 and 72 of common electrode 270 includes a central transverse portion, a pair of oblique portions, and a pair of terminal longitudinal portions. The central transverse portion is disposed near the left edge or a center of the pixel electrode 190 and extends along the imaginary transverse bisecting line. The oblique portions of the cutouts 71 and 72 of common electrode 270 extend from an end of the central transverse portion approximately to the right edge of the pixel electrode. The oblique portions of the cutouts 71 and 72 of common electrode 270 make oblique angles with the central transverse portion. The terminal longitudinal portions extend from the ends of the respective oblique portions along the right edge of the pixel electrode 190, overlapping the right edge of the pixel electrode 190, and making obtuse angles with the respective oblique portions.

The cutouts 72 and 73 of common electrode 270 overlap the oblique portions of the interconnections 178.

The number of the cutouts 71-74b of common electrode 270 may be varied depending on the design factors, and the light blocking member 220 may overlap the cutouts 71-74b of common electrode 270 to block the light leakage through the cutouts 71-74b.

Alignment layers 11 and 21 that may be homeotropic are coated on inner surfaces of the panels 100 and 200, and polarizers 12 and 22 are provided on outer surfaces of the panels 100 and 200 so that the polarization axes POL of the panels 100 and 200 may be crossed and the polarization axes POL may be transverse and longitudinal to be parallel to the gate lines 121 or to the data lines 171. One of the polarizers 12 and 22 may be omitted when the LCD is a reflective LCD.

The LCD may further include at least one retardation film (not shown) for compensating the retardation of the LC layer 3. The retardation film has birefringence and gives a retardation opposite to that given by the LC layer 3.

The LCD may further include a backlight unit (not shown) supplying light to (and through) the LC layer 3 through the polarizers 12 and 22, the retardation film, and the panels 100 and 200.

It is preferable that the LC layer 3 has negative dielectric anisotropy and that it is subjected to a vertical alignment such that the LC molecules in the LC layer 3 are aligned such that their long axes are substantially vertical (perpendicular) to the surfaces of the panels 100 and 200 in the absence of an applied electric field. Accordingly, incident light cannot pass the crossed polarization system 12 and 22 in the absence of an applied electric field.

FIG. 5 is an equivalent circuit diagram of the LCD shown in FIGS. 1-4.

Referring to FIG. 5, a pixel PX of the LCD includes a TFT transistor Q, a first subpixel PXa including a first LC capacitor Clca and a first storage capacitor Csta, a second subpixel PXb including a second LC capacitor Clcb and a second storage capacitor Cstb, and a coupling capacitor Ccp.

The first LC capacitor Clca includes an outer sub-pixel electrode 190a as one terminal, a portion of the common electrode 270 corresponding thereto as the other terminal, and a portion of the LC layer 3 (FIG. 4) disposed therebetween as a dielectric. Similarly, the second LC capacitor Clcb includes an inner sub-pixel electrode 190b as one terminal, a portion of the common electrode 270 corresponding thereto as the other terminal, and a portion of the LC layer 3 disposed therebetween as a dielectric.

The first storage capacitor Csta includes the outer sub-pixel electrode 190a as one terminal, portions of a storage electrode line 131 overlapping the outer sub-pixel electrode 190a as the other terminal, and a portions of the passivation layer 180 and of the gate insulating layer 140 (FIG. 4) disposed therebetween as a dielectric. Likewise, the second storage capacitor Cstb includes the inner sub-pixel electrode 190b as one terminal, portions of a storage electrode line 131 overlapping the inner sub-pixel electrode 190b as the other terminal, and a portions of the passivation layer 180 and of the gate insulating layer 140 disposed therebetween as a dielectric.

The coupling capacitor Ccp includes the inner sub-pixel electrode 190b as one terminal, a coupling electrode 176 (and a portion of the interconnection 178) as the other terminal, and portions of the passivation layer 180 disposed therebetween as a dielectric.

The first LC capacitor Clca and the first storage capacitor Csta are connected in parallel to a drain of the TFT transistor Q (via 185, 177 and 175), and the second LC capacitor Clcb and the second storage capacitor Cstb are connected in parallel to the coupling capacitor. The coupling capacitor Ccp is connected between the drain of the TFT transistor Q and the second LC capacitor Clcb. The common electrode 270 (FIG. 4) is supplied with a common voltage Vcom, and the storage electrode lines 131 may also be supplied with the common voltage Vcom.

The TFT Q applies data voltages from a data line 171 (via 173) to the first LC capacitor Clca and the coupling capacitor Ccp in response to a gate signal from a gate driver (via gate line 121), and the coupling capacitor Ccp transmits the data voltage having a modified magnitude (by the capacitor Ccp) to the second LC capacitor Clcb.

If the storage electrode line 131 is supplied with the common voltage Vcom and each of the capacitors Clca, Csta, Clcb, Cstb and Ccp and the capacitances thereof are denoted as the same reference characters (Clca, Csta, Clcb, Cstb and Ccp), the voltage Vb charged across the second LC capacitor Clcb is given by:

$$Vb = Va \times [Ccp/(Ccp+Clcb+Cstb)],$$

where Va denotes the voltage of the first LC capacitor Clca.

Since the term Ccp/(Ccp+Clcb+Cstb) is smaller than one, the voltage Vb of the second LC capacitor Clcb is smaller than the voltage Va the first LC capacitor Clca. This inequality of voltages may be also true for a case that the voltage of the storage electrode line 131 is not equal to the common voltage Vcom. However, the voltage Vb of the second LC capacitor Clcb may be smaller than that of the first LC capacitor Clca, for example, by precharging the second LC capacitor Clcb with a predetermined voltage such as the common voltage Vcom.

When the potential difference is generated across the first LC capacitor Clca or the second LC capacitor Clcb, an electric field substantially perpendicular to the surfaces of the panels 100 and 200 is generated in the LC layer 3 and both the pixel electrode 190 and the common electrode 270 are commonly referred to as field generating electrodes hereinafter. Then, the LC molecules in the LC layer 3 tilt in response to the electric field such that their long axes become perpendicular to the field direction. The degree of the tilt ("tilt angle") of the LC molecules determines the change of the polarization of light incident on the LC layer 3 and the change of the light polarization causes a change of the light transmittance through the polarizers 12 and 22. In this way, the LCD displays images.

The tilt angle of the LC molecules depends on the strength of the electric field (perpendicular to the surfaces of the panels 100 and 200 generated in the LC layer 3). Since the voltage Va of the first LC capacitor Clca and the voltage Va of the second LC capacitor Clcb are different from each other, the tilt direction of the LC molecules in the first subpixel is different from the tilt direction of the LC molecules in the second subpixel and thus the luminances of the two subpixels are different. Accordingly, the average luminance of the two subpixels is a target luminance, and the voltages Va and Vb of the first and the second subpixels can be adjusted so that an image viewed from a lateral side is the most similar to an image viewed from the front, thereby improving the lateral visibility.

The ratio of the voltages Va and Vb can be adjusted by varying the capacitance of the coupling capacitor Ccp, and the coupling capacitance Ccp can be varied by changing the overlapping area of the coupling electrode 176 and/or by changing the distance between the coupling electrode 176 and the central sub-pixel electrode 190b. Preferably, the voltage Vb of the second LC capacitor Clcb is from about 0.6 to about 0.8 times the voltage Va of the first LC capacitor Clca.

The voltage Vb charged in the second LC capacitor Clcb may be larger than the voltage Va of the first LC capacitor Clca. This can be realized by precharging the second LC capacitor Clcb with a predetermined voltage such as the common voltage Vcom.

The ratio of the lower and the upper sub-pixel electrodes 190a1 and 190a2 of the first subpixel and the central sub-pixel electrode 190b of the second subpixel is preferably from about 1:0.85 to about 1:1.15 and the number of the sub-pixel electrodes in each of the LC capacitors Clca and Clcb may be changed.

The tilt direction of the LC molecules is determined by a horizontal component generated by the cutouts 91-94b and 71-74b of the field generating electrodes 190 and 270 and the oblique edges of the pixel electrodes 190 distorting the electric field, which is substantially perpendicular to the edges of the cutouts 91-94b and 71-74b and to the oblique edges of the pixel electrodes 190. Referring to FIG. 3, a set of the cutouts 91-94b and 71-74b divides a pixel electrode 190 into a plurality of sub-areas and each sub-area has two major edges. Since the LC molecules on each sub-area tilt perpendicular to the major edges, the azimuthal distribution of the tilt directions are localized to four directions, thereby increasing the reference viewing angle of the LCD.

The shapes and the arrangements of the cutouts 91-94b and 71-74b for determining the tilt directions of the LC molecules may be modified and at least one of the cutouts 91-94b and 71-74b can be substituted with protrusions (not shown) or depressions (not shown). The protrusions are preferably made of organic or inorganic material and disposed on or under the field-generating electrodes 190 or 270.

The orientations of the LC molecules may be distorted near edges of the underlying members such as the coupling electrodes 176 and the interconnections 178 due to the step difference. However, since two edges of the coupling electrodes 176 are longitudinal such that the edges are parallel to a polarization axis of the polarizers 12 and 22, the LC molecules may pre-tilt in a direction parallel to the other polarization axis and thus the distortion of the molecular orientations may cause minimal light leakage. Similarly, the longitudinal portions of the interconnections 178 may not cause significant light leakage.

In addition, the light leakage that may be caused by the oblique edges of the coupling electrodes 176 and by the oblique edges of the interconnections 178 (178a & 178c) can be blocked by the fourth storage electrodes 133d and the cutouts 93, 72 and 73b of the field generating electrodes 190 and 270.

Other members that overlap the pixel electrode 190 and make step difference also have transverse or longitudinal edges such that the step difference may not cause significant light leakage. Furthermore, the openings 225 of the light blocking members 220 also have transverse and longitudinal edges such that the step difference may not cause significant light leakage.

An LCD according to another embodiment of the invention will be described in detail with reference to FIGS. 6 and 7.

Figure 6:
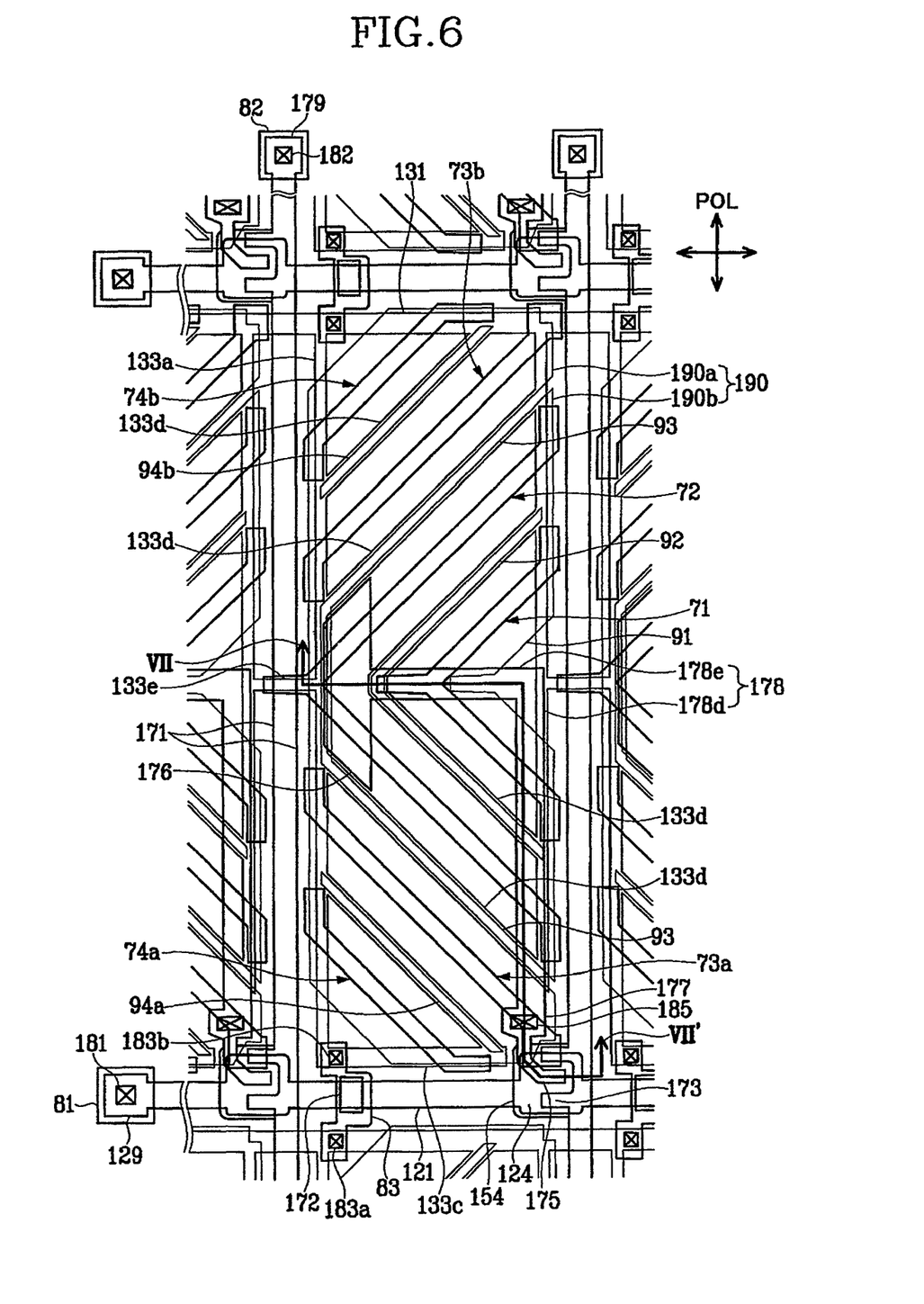
FIG. 6 is a layout view of an LCD according to another embodiment of the invention.
Figure 7:
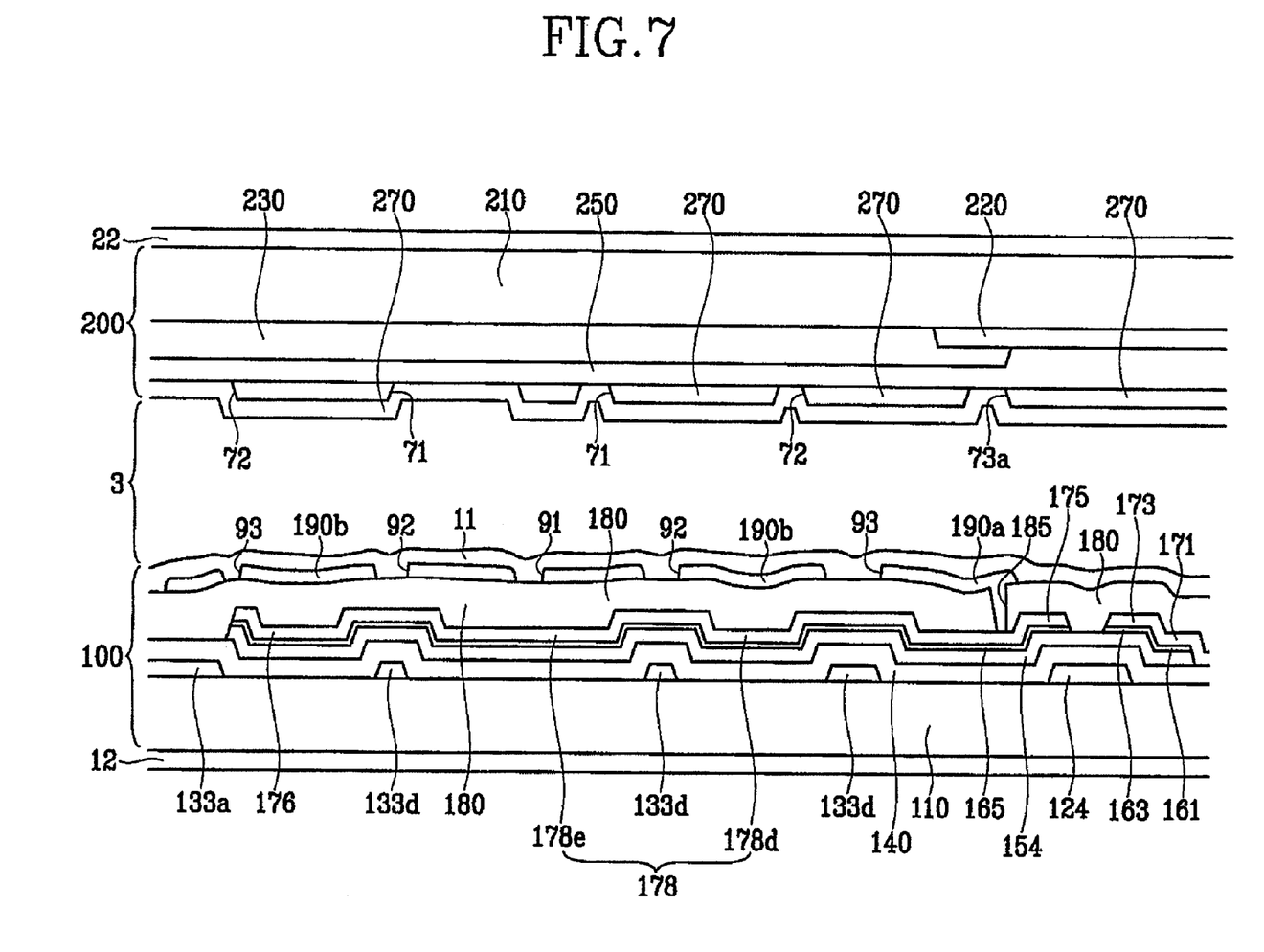
FIG. 7 is a sectional view of the LCD shown in FIG. 6 taken along section line VII-VII'.

FIG. 6 is a layout view of an LCD according to another embodiment of the invention, and FIG. 7 is a sectional view of the LCD shown in FIG. 6 taken along section line VII-VII'.

Referring to FIGS. 6 and 7, an LCD according to this embodiment similarly includes a TFT array panel 100, a common electrode panel 200, a LC layer 3 interposed between the panels 100 and 200, and a pair of polarizers 12 and 22 attached on outer surfaces of the panels 100 and 200 and having transverse and longitudinal polarization axes POL.

Layered structures of the panels 100 and 200 according to this embodiment are almost the same as those shown in FIGS. 1-4, except for differences noted among the following described features:

Regarding the TFT array panel 100, a plurality of gate lines 121 including gate electrodes 124 and end portions 129, and a plurality of storage electrode lines 131 (including storage electrodes 133a-133d and connections 133e) are formed on a substrate 110. A gate insulating layer 140, a plurality of semiconductor stripes 151, and a plurality of ohmic contacts 161 and 165 are sequentially formed on the gate lines 121 and the storage electrodes lines 131. A plurality of data lines 171 including source electrodes 173 and end portions 179, a plurality of drain electrodes 175 including expansions 177 and 176 and interconnections 178, and a plurality of metal interconnects 172 are formed on the ohmic contacts 161 and 165. A passivation layer 180 is formed on the data lines 171, the drain electrodes 175 (and interconnections 178), the metal interconnects 172, and exposed portions of the semiconductor stripes 151 (154). A plurality of contact holes 181, 182, 183a, 183b and 185 are provided at (through) the passivation layer 180 and the gate insulating layer 140. A plurality of pixel electrodes 190 including subpixel electrodes 190a and 190b and having cutouts 91-94b (91, 92, 93, 94a, & 94b), a plurality of overpasses 83, and a plurality of contact assistants 81 and 82 are formed on the passivation layer 180; and an alignment layer 11 is coated thereon.

Regarding the common electrode panel 200, a light blocking member 220, a plurality of color filters 230, an overcoat 250, a common electrode 270 having cutouts 71-74b (71, 72, 73, 74a & 74b), and an alignment layer 21 are formed on an insulating substrate 210.

Different from the LCD shown in FIGS. 1-4, each of the interconnections 178 includes only a longitudinal portion 178d and a transverse portion 178e (and not and oblique portion), to reduce light leakage caused by step difference.

Further, the semiconductor stripes 151 have almost the same planar shapes as the data lines 171 and the drain electrodes 175 as well as the underlying ohmic contacts 161 (163) and 165. However, the semiconductor stripes 151 include some exposed portions (at the semiconductor islands 154), which are not entirely covered with the data lines 171 and the drain electrodes 175, such as portions located between the source electrodes 173 and the drain electrodes 175 (see 154, 173 & 175 in FIG. 7).

In addition, the TFT array panel further includes a plurality of semiconductor islands (not shown) and a plurality of ohmic contact islands (not shown) that are disposed under the isolated metal interconnects 172 and have substantially the same planar shape as the isolated metal interconnects 172.

A passivation layer 180 (FIG. 7) is formed on the data lines 171 (source electrodes 173), the drain electrodes 175, the metal interconnects 172, and the exposed portions of the semiconductor stripes 151 (e.g., the semiconductor islands 154). The passivation layer 180 and the gate insulating layer 140 has a plurality of contact holes 182, 185.

A manufacturing method of the TFT array panel according to an embodiment simultaneously forms the data lines 171, the drain electrodes 175, the metal interconnects 172, the semiconductors 151 (154), and the ohmic contacts 161 (163) and 165 using one photolithography step.

A photoresist masking pattern for the photolithography process has position-dependent thickness, and in particular, it has thicker portions and thinner portions. The thicker portions are located on wire (metal) areas that will be occupied by the data lines 171, the drain electrodes 175, and the metal interconnects 172, while the thinner portions are located on semiconductor (154) channel areas of TFTs.

The position-dependent thickness of the photoresist may be obtained by several techniques, for example, by providing translucent areas on the exposure mask as well as transparent areas and light blocking opaque areas. The translucent areas may have a slit pattern, a lattice pattern, a thin film(s) with intermediate transmittance or intermediate thickness. When using a slit pattern, it is preferable that the width of the slits or the distance between the slits is smaller than the resolution of a light exposer used for the photolithography. Another example is to use reflowable photoresist. In such a technique, once a photoresist pattern made of a reflowable material is formed by using a normal exposure mask (only with transparent areas and opaque areas), it is subject to reflow process to flow onto areas without the photoresist, thereby forming thin portions.

As a result, the manufacturing process is simplified by omitting a photolithography step.

Many of the above-described features of the LCD shown in FIGS. 1-4 according to a first embodiment of the invention may be appropriate to the LCD shown in FIGS. 6 and 7 according to another embodiment of the invention.

An LCD according to another embodiment of the invention will be described in detail with reference to FIG. 8.

Figure 8:
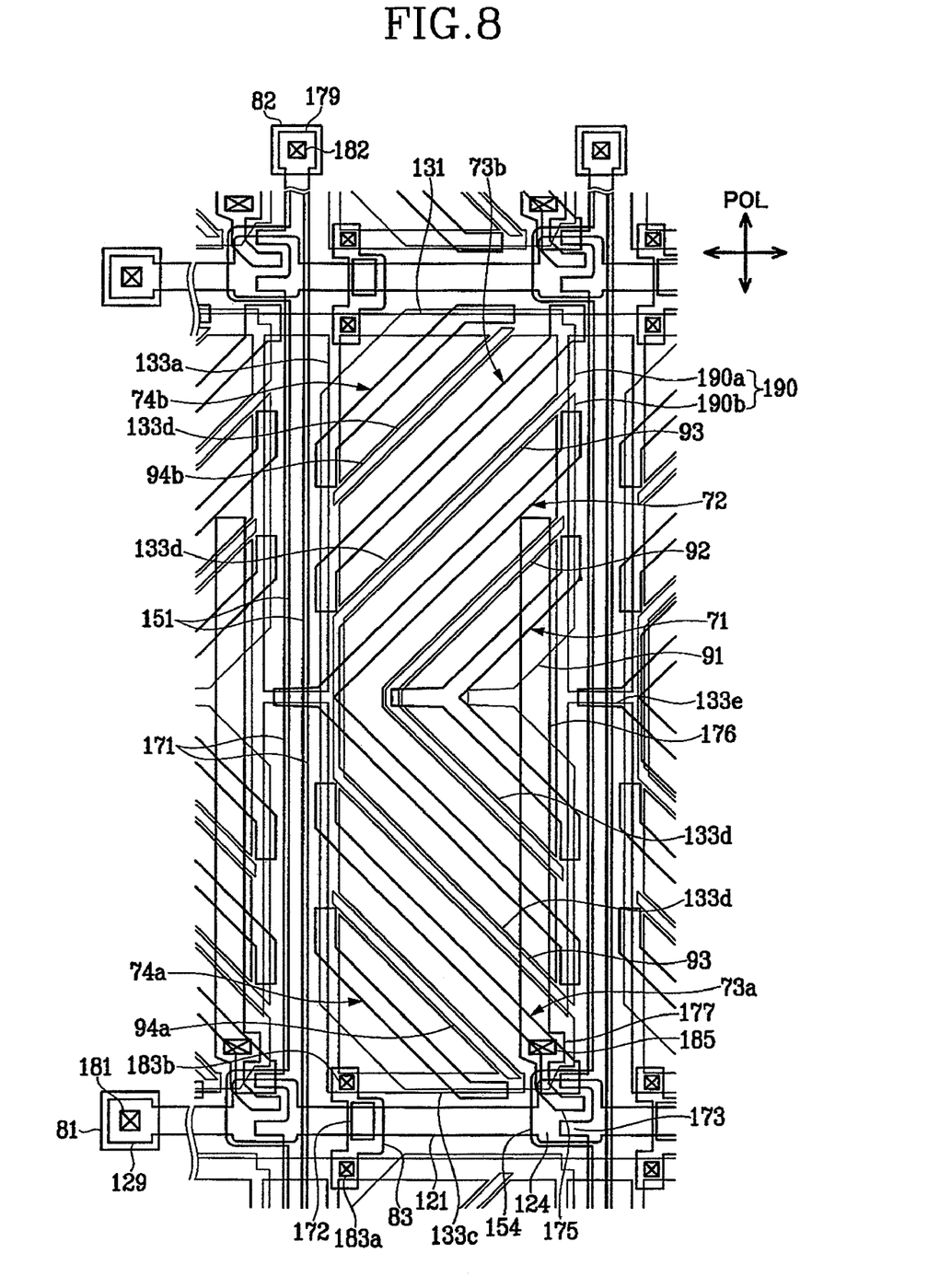
FIG. 8 is a layout view of an LCD according to another embodiment of the invention.

FIG. 8 is a layout view of an LCD according to another embodiment of the invention.

A sectional view of the LCD shown in FIG. 8 would be almost the same as the sectional view shown in FIG. 4, and thus much of the description of FIG. 4 will apply as well to FIG. 8.

Referring to FIGS. 4 and 8, an LCD according to this embodiment also includes a TFT array panel 100, a common electrode panel 200, a LC layer 3 interposed between the panels 100 and 200, and a pair of polarizers 12 and 22 attached on outer surfaces of the panels 100 and 200 and having transverse and longitudinal polarization axes POL.

Layered structures of the panels 100 and 200 according to this embodiment (FIG. 8) are almost the same as those shown in FIGS. 1-4 except for differences noted among the following described features:

Regarding the TFT array panel 100, a plurality of gate lines 121 including gate electrodes 124 and end portions 129, and a plurality of storage electrode lines 131 including storage electrodes 133a-133d and connections 133e are formed on a substrate 110. A gate insulating layer 140, a plurality of semiconductor stripes 151 (154), and a plurality of ohmic contacts 161 and 165 are sequentially formed on the gate lines 121 and the storage electrodes lines 131. A plurality of data lines 171 including source electrodes 173 and end portions 179, a plurality of drain electrodes 175 including expansions 177 and coupling electrodes 176, and a plurality of metal interconnects 172 are formed on the ohmic contacts 161 (163) and 165. A passivation layer 180 is formed on the data lines 171, the drain electrodes 175, the metal interconnects 172, and exposed portions of the semiconductor stripes 151.

A plurality of contact holes 181, 182, 183a, 183b and 185 (see e.g., FIG. 4) are provided at (or through) the passivation layer 180 and the gate insulating layer 140 (e.g., exposing the drain electrodes 175, the expansions 177, and end portions 179 of the data lines 171). A plurality of pixel electrodes 190 including subpixel electrodes 190a and 190b (FIGS. 1, 3, & 4) and having cutouts 91, 92, 93, 94a and 94b (FIGS. 1, 3, & 4) a plurality of overpasses 83, and a plurality of contact assistants 81 and 82 are formed on the passivation layer 180; and an alignment layer 11 is coated thereon.

Regarding the common electrode panel 200, a light blocking member 220, a plurality of color filters 230, an overcoat 250, a common electrode 270 having cutouts 71-74b (see FIG. 2), and an alignment layer 21 are formed on an insulating substrate 210.

Different from the LCD shown in FIGS. 1-4, the coupling electrodes 176 rectilinearly extend in the longitudinal direction and there is no distinguishable interconnection (compared with interconnection 178 in FIG. 1). Since the coupling electrodes 176 have only longitudinal and transverse edges, the light leakage due to the step difference may be insignificant.

The coupling electrodes 176 may overlap the storage electrodes 133b.

Many of the above-described features of the LCD shown in FIGS. 1-4 may be appropriate to the LCD shown in FIG. 8.

According to another embodiment of the invention, the TFT array panel 100 includes color filters, and the common electrode panel 200 has no color filter.

The disclosed arrangement the edges of the members underlying the pixel electrodes to be parallel to or perpendicular to the polarization axes of the polarizers may be employed to other types of LCDs such as twisted nematic (TN) mode LCDs and in-plane switching (IPS) mode LCDs.

While the invention has been described in detail with reference to the preferred embodiments, those skilled in the art will appreciate that various modifications and substitutions can be made thereto without departing from the spirit and scope of the invention as set forth in the appended claims.

What is claimed is:

1. A liquid crystal display comprising:
a substrate;
a gate line disposed on the substrate;
a data line intersecting the gate line;
a thin film transistor comprising a gate electrode connected to the gate line, a source electrode connected to the data line, and a drain electrode;
an interconnection connected to the drain electrode;
a coupling electrode connected to the interconnection;
a passivation layer disposed on the gate line, the data line, the thin film transistor, the interconnection, and the coupling electrode;
a first sub-pixel electrode disposed on the passivation layer and connected to the drain electrode; and
a second sub-pixel electrode disposed on the passivation layer, spaced apart from the first sub-pixel electrode, and overlapping the coupling electrode and the interconnection.

2. The liquid crystal display of claim 1, wherein the second sub-pixel electrode is approximately trapezoidal and has an edge substantially parallel to the data line.

3. The liquid crystal display of claim 2, wherein the coupling electrode follows a shape of the second sub-pixel electrode such that the coupling electrode is approximately trapezoidal and has an edge substantially parallel to the data line.

4. The liquid crystal display of claim 2, wherein the first-subpixel electrode comprises an upper portion disposed above the second sub-pixel electrode in a longitudinal direction, and a lower portion disposed under the second sub-pixel electrode in the longitudinal direction.

5. The liquid crystal display of claim 4, further comprising:
a storage electrode disposed under the passivation layer and extending along the data line,
wherein the first-subpixel electrode further comprises a longitudinal connection connecting the upper portion and the lower portion of the first sub-pixel electrode, the first sub-pixel electrode and the second sub-pixel electrode are spaced apart from each other by a gap, and the gap comprises a longitudinal portion overlapping the storage electrode.

6. The liquid crystal display of claim 2, wherein a ratio of areas of the first sub-pixel electrode and the second sub-pixel electrode is from about 1:0.85 to about 1:1.15.

7. The liquid crystal display of claim 1, wherein the interconnection is bent at least once.

8. The liquid crystal display of claim 1, wherein the passivation layer comprises an inorganic insulating film and an organic insulating film disposed on the inorganic insulating film.

9. The liquid crystal display of claim 1, further comprising:
a storage electrode line disposed under the passivation layer; and
an overpass disposed on the passivation layer, overlapping the storage electrode line and the gate line, and spaced apart from the first and the second sub-pixel electrodes.

10. A method of manufacturing a thin film transistor array panel, the method comprising:
forming a gate line comprising a gate electrode on a substrate;
forming a gate insulating layer on the gate line;
forming a semiconductor layer on the gate insulating layer;
forming a data line and a drain electrode on the semiconductor layer;
forming a passivation layer on the data line, the drain electrode, and the semiconductor layer, the passivation layer having a contact hole exposing the drain electrode; and
forming a first sub-pixel electrode and a second sub-pixel electrode spaced apart from the first sub-pixel electrode on the passivation layer, the first sub-pixel electrode connected to the drain electrode through the contact hole,
wherein the data line comprises a source electrode, the drain electrode comprising an interconnection and a coupling electrode connected to the interconnection, and the second sub-pixel electrode overlaps the interconnection and the coupling electrode.

11. The method of claim 10, wherein the second sub-pixel electrode is substantially trapezoidal, and
the coupling electrode is substantially trapezoidal and has an edge substantially parallel to the data line.

12. The method of claim 10, wherein the interconnection is bent at least once.

13. The method of claim 10, wherein the formation of the passivation layer comprises:
forming an inorganic insulating film; and
forming an organic insulating film on the inorganic insulating film.

14. The method of claim 10, further comprising:
forming a storage electrode line under the passivation layer; and
forming an overpass on the passivation layer, the overpass overlapping the storage electrode line and the gate line and spaced apart from the first and the second sub-pixel electrodes.

15. The method of claim 10, further comprising:
forming a storage electrode under the passivation layer, the storage electrode extending along the data line,
wherein the first-subpixel electrode comprises an upper portion disposed above the second sub-pixel electrode in a longitudinal direction, a lower portion disposed under the second sub-pixel electrode in the longitudinal direction, and a longitudinal connection connecting the upper portion and the lower portion of the first sub-pixel electrode,
the first sub-pixel electrode and the second sub-pixel electrode are spaced apart from each other by a gap, and
the gap comprises a longitudinal portion overlapping the storage electrode.

16. The method of claim 10, wherein a ratio of areas of the first sub-pixel electrode and the second sub-pixel electrode is from about 1:0.85 to about 1:1.15.

* * * * *